United States Patent [19]
Booth et al.

[11] Patent Number: 5,096,036
[45] Date of Patent: Mar. 17, 1992

[54] ELECTROMAGNETIC COUPLING DISCS AND METHOD OF MAKING THE SAME

[75] Inventors: Dwight E. Booth, Janesville, Wis.; Daniel L. DeYoung; Steven A. Kruger, both of Roscoe, Ill.

[73] Assignee: Dana Corporation, Toledo, Ohio

[21] Appl. No.: 531,465

[22] Filed: May 31, 1990

[51] Int. Cl.$^5$ .............. F16D 27/10; F16D 27/14; F16D 13/58

[52] U.S. Cl. .............. 192/107 R; 29/607; 192/84 C; 335/281

[58] Field of Search .............. 192/84 C, 84 R, 107 R; 219/121.72; 335/281; 29/602.1, 607

[56] References Cited

U.S. PATENT DOCUMENTS

| | | | |
|---|---|---|---|
| 2,739,684 | 3/1956 | Meyer | 192/84 C |
| 2,860,403 | 11/1958 | Meyer | 192/84 C X |
| 3,712,439 | 1/1973 | Schacher et al. | 192/84 C |
| 4,187,939 | 2/1980 | Silvestrini et al. | 192/84 C |
| 4,227,600 | 10/1980 | Shirai | 192/84 C |
| 4,685,202 | 8/1987 | Booth et al. | 29/607 |
| 4,818,840 | 4/1989 | Booth et al. | 219/121.72 |
| 4,891,077 | 1/1990 | Roll et al. | 29/607 X |
| 4,891,619 | 1/1990 | Booth et al. | 335/296 |
| 4,951,797 | 8/1990 | Booth et al. | 192/107 R |

FOREIGN PATENT DOCUMENTS

| | | | |
|---|---|---|---|
| 0127128 | 8/1982 | Japan | 192/84 R |
| 1515778 | 6/1978 | United Kingdom . | |
| 1586009 | 3/1981 | United Kingdom . | |

Primary Examiner—Rodney H. Bonck
Attorney, Agent, or Firm—Leydig, Voit & Mayer

[57] ABSTRACT

One face of a coupling disc (i.e., the armature or rotor) of an electromagnetic coupling such as a clutch or brake is formed with a plurality of radially spaced and circumferentially extending grooves. The other face of the disc is formed with a plurality of radially spaced rows of circumferentially extending slots which communicate with the grooves so as to form air gaps completely through the disc. In the preferred embodiment, each groove is circumferentially continuous while each row of slots is defined by circumferentially spaced slots which are separated by short bridges. By virtue of forming the grooves in the disc, only a small thickness of material need be removed from the disc in order to form the slots.

14 Claims, 2 Drawing Sheets

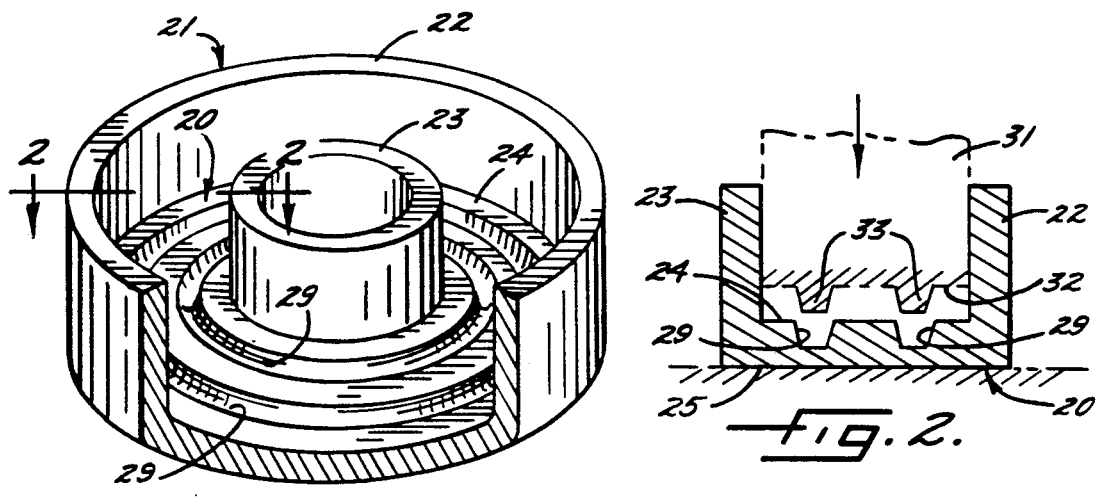
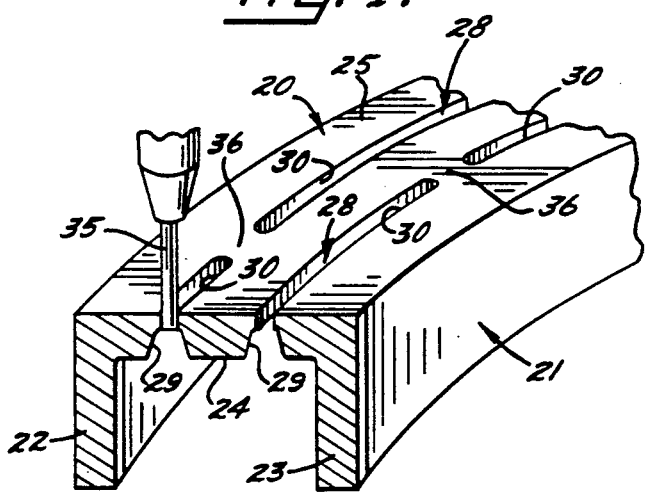
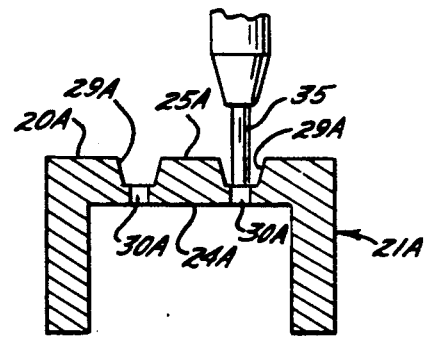
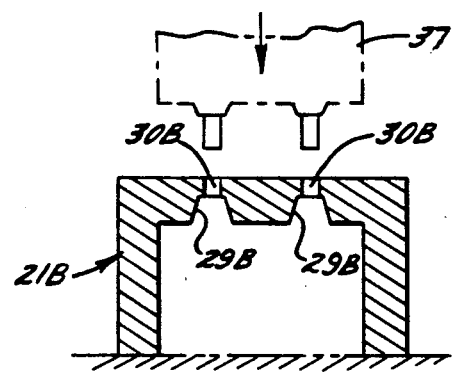

ELECTROMAGNETIC COUPLING DISCS AND METHOD OF MAKING THE SAME

BACKGROUND OF THE INVENTION

This invention relates to multiple pole coupling discs of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of magnetic material such as steel and having a field with a rotary coupling disc or rotor which also is made of magnetic material. When the coil of the field is excited, magnetic flux threads a path between the rotor and the axially opposing armature and attracts the armature into engagement with the working face of the rotor to couple the two for rotation in unison.

In the coupling disclosed in the Silvestrini et al patent, the armature is formed with a ring of angularly spaced "banana" slots while the rotor is formed with two concentric rings of angularly spaced banana slots located on opposite sides of the ring of slots in the armature. The banana slots form high reluctance air gaps causing the rotor and armature to define four magnetic poles which increase the torque of a coupling having a coil of a given diameter. By forming an additional ring of slots in each of the rotor and armature, the coupling may be constructed as a six-pole coupling with even higher torque capacity.

Until just recently, the banana slots conventionally have been stamped in the rotor and armature. Presently available stamping techniques dictate that, as a general rule, the radial width of the slots cannot be substantially less than approximately ¾ the thickness of the disc. As a result, difficulty is encountered in stamping multiple rings of slots in a comparatively thick disc which is relatively small in diameter. In addition, stamping of the slots leaves burrs at the edges of the slots and tends to impose restrictions on the location of the slots in the disc and on the shape of the slots. It is difficult to maintain concentricity between adjacent rows of slots and it is difficult to keep all portions of the disc of a uniform thickness. The design of the disc thus tends to be dictated by tooling considerations rather than magnetic characteristics.

As an alternative to slotting the rotor and armature to form high reluctance air gaps, channels may be machined in the disc and then filled with nonmagnetic material to define high reluctance barriers between the poles. Subsequently, the disc is machined to remove the bottoms of the magnetic channels and eliminate the flux leakage paths which otherwise would be created across the bottoms of the channels. This manufacturing process is relatively expensive and becomes even more so when each disc is formed with two or more high reluctance rings.

Formation of the slots in a coupling disc through the use of a laser beam is disclosed in commonly assigned Booth et al U.S. Pat. No. 4,685,202. In the method disclosed in that patent, the laser beam forms continuous slots which are immediately backfilled with non-magnetic material. Alternatively, the method contemplates the formation of angularly spaced banana slots separated by non-magnetic bridges which are formed by backfilling the spaces between the slots with non-magnetic material.

The methods disclosed in the aforementioned Booth et al patent represent remarkable improvements in the art of magnetic coupling discs. Even those methods, however, have some limitations. For example, the formation of slots of any substantial radial width requires the use of a very powerful laser having a beam of substantial diameter. In addition, backfilling of the slots or portions thereof imposes some restriction on the cross-sectional shape and/or the orientation of the slots.

Booth et al U.S. Pat. No. 4,818,840 discloses another method of forming slots in an electromagnetic coupling disc through use of a laser. Specifically, the laser beam traces around the perimeter of each slot to be formed and forms the slot by cutting a slug of material from the disc. This method enables relatively precise control of the shape, location and edge finish of the slots but is somewhat slow from a manufacturing standpoint since the entire perimeter of each slot must be traced by the laser beam. In addition, it is necessary to reprogram the path of travel of the laser beam each time the slot configuration, location or size is changed.

SUMMARY OF THE INVENTION

The general aim of the present invention is to provide a new and improved electromagnetic coupling disc, and a method of making the same, which enables a coupling having a coil of a given diameter to produce higher torque and which, at the same time, is quicker and easier to manufacture and is less vulnerable to variations in the manufacturing process.

A more detailed object is to achieve the foregoing through the provision of a coupling disc in which the magnetic poles are delineated by coacting grooves and slots which communicate with one another to form air gaps completely through the disc, the slots being comparatively small in depth so as to reduce the time and effort required to form the slots.

A further object of the invention is to provide a coupling disc in which circumferentially extending, circumferentially continuous and radially spaced grooves are formed in one face of the disc while circumferentially extending and radially spaced rows of circumferentially spaced slots are formed in the other face of the disc and are located in radial alinement with the grooves so as to form air gaps completely through the disc. By virtue of the grooves, the axial thickness of material needed to be removed from the disc to form the slots is significantly reduced so as to enable the disc to be manufactured in less time and with greater precision.

The invention also resides in the novel methods used to form the grooves and slots in the disc.

These and other objects and advantages of the invention will become more apparent from the following detailed description when taken in conjunction with the accompanying drawings.

BRIEF DESCRIPTION OF THE DRAWINGS

FIG. 1 is a perspective view showing one type of a new and improved electromagnetic coupling disc incorporating the unique features of the present invention.

FIG. 2 is an enlarged cross-section taken along the line 2—2 of FIG. 1 and schematically shows grooves being formed in the non-working face of the disc.

FIG. 3 is a fragmentary perspective view schematically showing slots being formed in the working face of the grooved disc illustrated in FIG. 2.

FIG. 4 is a cross-sectional view generally similar to FIG. 2 but shows a disc with grooves in its working face and with slots being formed in its non-working face.

FIG. 5 also is a cross-sectional view similar to FIG. 2 but schematically shows another method of forming slots in the working face of the disc.

DETAILED DESCRIPTION OF THE PREFERRED EMBODIMENTS

Figure 6:
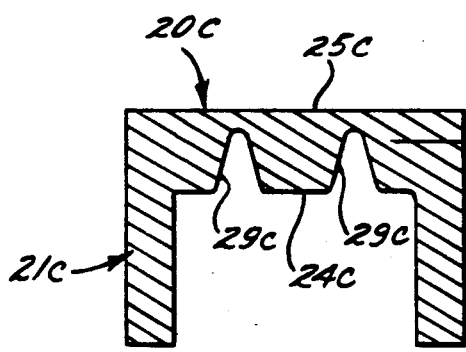
FIGS. 6 and 7 are cross-sectional views of a coupling disc with FIG. 6 showing the disc prior to formation of slots and with FIG. 7 showing the disc after the slots have been formed by still another method.

The drawings illustrate the present invention as being incorporated in a coupling disc 20 for use in an electromagnetic coupling such as an electromagnetic brake or clutch. While the disc could be an armature, it herein is shown as forming part of a clutch rotor 21 which may, for example, be of the type disclosed in the aforementioned Silvestrini et al patent. In this particular instance, the rotor is circular in shape and includes an axially extending outer flange 22 and an axially extending inner hub 23 which preferably are integral with one face 24 of the disc 20. The opposite face 25 (FIGS. 2 and 3) of the disc forms the working face of the rotor 21 and is adapted to frictionally engage the armature of the clutch. The flange 22 and the hub 23 define the outer and inner pole rings, respectively, of the rotor 21.

As is conventional, the rotor 21 is made of low reluctance magnetic material such as steel. While the rotor could be cast and then machined, it preferably is formed by a stamping or drawing operation.

The specific rotor 21 which has been illustrated in FIGS. 1 to 3 forms part of a four-pole clutch and thus the disc 20 includes two concentric rings 28 (FIG. 3) which carry less magnetic flux than the remaining areas of the disc. One magnetic pole is defined by that annular area of the disc located radially inwardly of the inner ring 28, two poles are defined by the annular area between the inner ring and the outer ring, and the fourth pole is defined by the annular area located outwardly of the outer ring.

In accordance with the present invention, the rings 28 are defined by a unique combination of grooves 29 and slots 30 which result in the formation of air gaps completely through the disc 20. The grooves 29 are formed in one face 24, 25 of the disc while the slots 30 are formed in the opposite face of the disc in radial alinement with the grooves. By virtue of the grooves, only a small thickness of material need be removed from the disc in order to form the slots and thus the slots may be formed more quickly and more precisely than has been possible heretofore.

The preferred method of forming the grooves 29 in the disc 20 is illustrated in FIG. 2. In carrying out this method, provision is made of a circular ring-like punch 31 having a forming face 32 adapted to be disposed in opposing relation with the non-working face 24 of the disc 20. Formed on and projecting axially from the forming face of the punch are two radially spaced and circumferentially extending ribs 33 which are used to form the grooves 29.

After the rotor 21 has been stamped, the non-working face 24 of the disc 20 is struck with the punch 31 to cause the ribs 33 to form the circumferentially continuous grooves 29 by cold flow of the metal. The height of the ribs is less than the thickness of the disc and thus the grooves are formed with closed ends or bottoms and do not interrupt the working face 25 of the disc.

A typical disc 20 has a thickness of approximately 0.165" and is formed with grooves 30 having a nominal depth of 0.120". Each groove preferably is formed with side walls which flare away from one another as they progress from the closed end of the groove toward the non-working face 24 of the disc 20. By way of example, each side wall may flare at an angle of approximately fifteen degrees.

The construction of the disc 20 as described thus far enables the rotor 21 to function in certain types of multiple pole electromagnetic couplings. The voids created by the grooves 29 are resistant to the flow of magnetic flux and thus cause magnetic poles to be set up on opposite sides of each groove. When formed as described, the grooves 29 are of a very precise shape, are very accurately located and are precisely concentric. The webbed areas at the closed ends of both grooves have virtually the same thickness and, in addition, there are virtually no variations from rotor-to-rotor.

In carrying out the invention, the magnetic effectiveness of the disc 20 is enhanced by virtue of the slots 30 coacting with the grooves 29 to form air gaps which extend completely through the axial thickness of the disc. In the embodiment shown in FIGS. 1 to 3, the slots are formed in the working face 25 of the disc by directing a laser beam 35 (FIG. 3) toward the working face. The slots preferably are cut by turning the disc about its own axis to cause a circular band of the disc to traverse past the beam although the disc could be held stationary and the beam traversed in a circular path around the disc.

As shown most clearly in FIG. 3, the laser beam 35 causes the slots 30 to be formed in radial alinement with the grooves 29, each slot having a relatively narrow radial width of approximately 0.050" and being sufficiently deep to communicate with the radially alined groove. While the grooves are tapered or flared in radial cross-section, the opposing sides of each slot are substantially parallel.

As the disc 20 turns, the laser beam 35 is periodically turned off. This causes the slots 30 of each row to be spaced circumferentially from one another and to be separated by bridges 36 (FIG. 3) of magnetic material having a thickness equal to the thickness of the bottom of the alined groove 29. The bridges impart structural integrity to the disc and enable the disc to remain as an integral component.

From the foregoing, it will be apparent that formation of the grooves 29 reduces the thickness of the material which must be cut away in order to form the slots 30. Thus the disc is formed with through-slots which define highly effective air gaps and yet the time required to form such slots is decreased since only a reduced thickness of metal need be cut in order to form the slots. The method of the present invention also enables a less powerful laser to be used to form the slots.

The rotor 21A shown in FIG. 4 is the same as the rotor 21 of FIGS. 1 to 3 except that, in the case of the rotor 21A, grooves 29A are formed in the working face 25A of the disc 20A while slots 30A are formed in the non-working face 24A. In FIG. 4, the laser beam 35 has been shown as being directed against the working face 25A in order to form the slots 30A but it will be appreciated that the laser could be directed against the non-working face 24A.

The rotor 21B shown in FIG. 5 is identical to the rotor 21 of FIGS. 1 to 3 except that the slots 30B of the rotor 21B are formed by stamping the disc with a punch 37 illustrated schematically in FIG. 5. Because of the preformed grooves 29B, the slots 30B are of very shallow depth and thus can be of a small radial width. Also, less punching force is required to form the slots.

Figure 7:
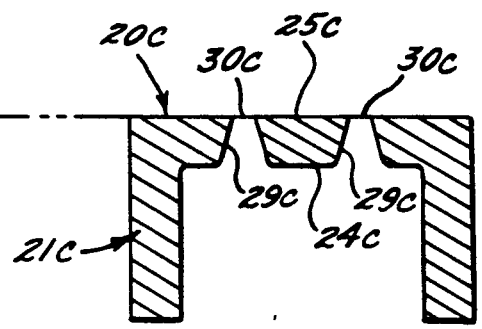

The rotor 21C shown in FIG. 6 is essentially the same as the rotor 21 shown in FIG. 2 except that, in the case of the rotor 21C, each groove 29C is circumferentially discontinuous and is formed with short angularly spaced bridges (not shown) in the manner disclosed in Booth et al U.S. Pat. No. 4,951,797. After the circumferentially interrupted grooves 29C have been formed in the non-working face 24C of the disc 20C, the slots 30C are formed by machining or grinding the disc from the working face 25C as shown in FIG. 7 thereby to machine or grind away the closed ends of the grooves and leave slots in the working face. The grooves 29C taper toward the working face 25C of the disc 20C and thus the radial width of the slots 30C can be controlled by controlling the depth of machining or grinding on the working face. The angularly spaced bridges of each groove 29C preserve the structural integrity of the disc 20C after formation of the slots 30C.

Figure 8:
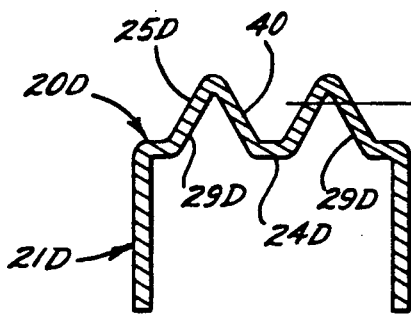
FIGS. 8 and 9 are cross-sectional views generally similar to FIGS. 6 and 7, respectively, but show another type of coupling disc.
Figure 9:
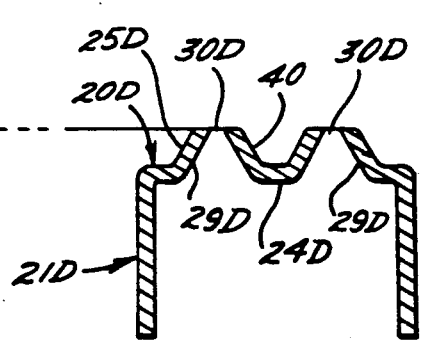

The rotor 21D of FIGS. 8 and 9 is essentially the same as the rotor 21C of FIGS. 6 and 7 except that the working face 25D of the disc 20D is corrugated. Thus, there exists a circumferentially extending groove 40 in the working face 25D between two slots 30D (FIG. 9) which are located at the working face and which communicate with grooves 29D in the non-working face 24D. The working face of the armature of the electromagnetic coupling has a shape which is complementary to the shape of the working face 25D of the disc 20D of the rotor 21D.

I claim:

1. A multiple pole coupling disc for an electromagnetic coupling, said disc being made of a single piece of magnetic material and having a working face and an oppositely facing non-working face, said working face being adapted to engage another coupling disc of the electromagnetic coupling, groove means formed in and extending generally circumferentially around one of the faces of said disc to delineate adjacent magnetic poles, and slot means formed in and extending circumferentially around the opposite face of said disc and communicating with said groove means thereby to form air gaps which extend completely through said disc between the faces of the disc, the radial cross-sectional shape of said slot means being different from the radial cross-sectional shape of said groove means, the axial depth of said groove means being greater than the axial depth of said slot means.

2. A coupling disc as defined in claim 1 in which said groove means are defined by a plurality of radially spaced and circumferentially continuous grooves, said slot means being defined by a plurality of radially spaced rows of circumferentially spaced slots, there being a row of slots in radial alinement with each of said grooves.

3. A coupling disc as defined in claim 2 in which said grooves and slots are formed in the non-working face and the working face, respectively, of said disc, there also being circumferentially extending groove means formed in the working face of said disc between adjacent rows of slots whereby the working face of said disc has a corrugated configuration.

4. A coupling disc as defined in claim 1 in which said groove means and said slot means are formed in the non-working face and the working face, respectively, of said disc.

5. A coupling disc as defined in claim 1 in which said groove means and said slot means are formed in the working face and the non-working face, respectively, of said disc.

6. A multiple pole coupling disc for an electromagnetic coupling, said disc being made of magnetic material and having a working face and an oppositely facing non-working face, said working face being adapted to engage another coupling disc of the electromagnetic coupling, a plurality of radially spaced grooves formed in and extending generally circumferentially around one of the faces of said disc to delineate adjacent magnetic poles, and a plurality of radially spaced and circumferentially extending rows of circumferentially spaced slots formed in the opposite face of said disc, said slots being in radial alinement with said grooves and communicating with said grooves thereby to form air gaps which extend completely through said disc between the faces of the disc.

7. A coupling disc as defined in claim 6 in which said grooves are circumferentially continuous.

8. A coupling disc as defined in claim 7 in which the depth of said grooves is greater than the depth of said slots.

9. A coupling disc as defined in claim 8 in which the radial cross-sectional shape of said grooves is different from the radial cross-sectional shape of said slots.

10. A coupling disc as defined in claim 7 in which said slots and said grooves are formed in the working face and non-working face, respectively, of said disc.

11. A method of forming a multiple pole coupling disc for an electromagnetic coupling, said method comprising the steps of, providing a generally circular disc made of magnetic material and having first and second oppositely facing faces, forming a plurality of radially spaced and circumferentially extending grooves in the first face of said disc by causing the material of said disc to flow, and removing material from the second face of said disc to form a plurality of radially spaced rows of circumferentially spaced slots in radial alinement with said grooves, said slots and said grooves communicating with one another to define air gaps which extend completely through said disc between the faces thereof.

12. A method as defined in claim 11 in which said slots are formed by cutting the second face of said disc with a laser to remove material from part of said second face.

13. A method as defined in claim 11 in which said slots are formed by punching the second face of said disc to remove material from part of said second face.

14. A method as defined in claim 11 in which said slots are formed by grinding the second face of said disc to remove metal from at least part of said second face.

* * * * *